(12) United States Patent
Komai

(10) Patent No.: US 7,123,432 B2
(45) Date of Patent: Oct. 17, 2006

(54) SERVO WRITER WITH ADJUSTMENT MECHANISM

(75) Inventor: Hirokazu Komai, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/076,009

(22) Filed: Mar. 10, 2005

(65) Prior Publication Data
US 2005/0201016 A1     Sep. 15, 2005

(30) Foreign Application Priority Data
Mar. 11, 2004 (JP) ............. 2004-068687
Feb. 23, 2005 (JP) ............. 2005-047164

(51) Int. Cl.
G11B 21/02 (2006.01)

(52) U.S. Cl. ............ 360/75; 360/130.21; 360/250; 360/76; 360/77.12

(58) Field of Classification Search ........ None
See application file for complete search history.

(56) References Cited

U.S. PATENT DOCUMENTS 4,485,420 A * 11/1984 Schoenmakers ....... 360/130.21
4,920,439 A * 4/1990 Bordignon ............ 360/130.21
6,399,522 B1   6/2002 Tsan et al.
6,497,377 B1 * 12/2002 Underkofler et al. .... 242/332.8

FOREIGN PATENT DOCUMENTS

JP     2001-93211 A     4/2001

* cited by examiner

Primary Examiner—Andrew L. Sniezek
(74) Attorney, Agent, or Firm—Sughrue Mion, PLLC

(57) ABSTRACT

Disclosed is a low-cost servo writer with a simple adjusting mechanism, which can record/reproduce servo signals on or from magnetic tapes precisely, and which makes it possible to shorten the adjusting and maintenance time and to minimize the uneven wear of its heads, thereby decreasing the level of contaminant of the heads. The servo writer includes (a) a head for recording/reproducing servo signals on or from a running tape, (b) a base, (c) a support arm having two ends, one of the ends being supported by the base, the other being a free end where the head is placed, wherein a position of the head relative to the tape is adjustable, and (d) tape guides for maintaining a constant lap angle, the tape guides being arranged on the free end of the support arm, wherein the lap angle is an angle which the head forms with the running tape.

9 Claims, 6 Drawing Sheets

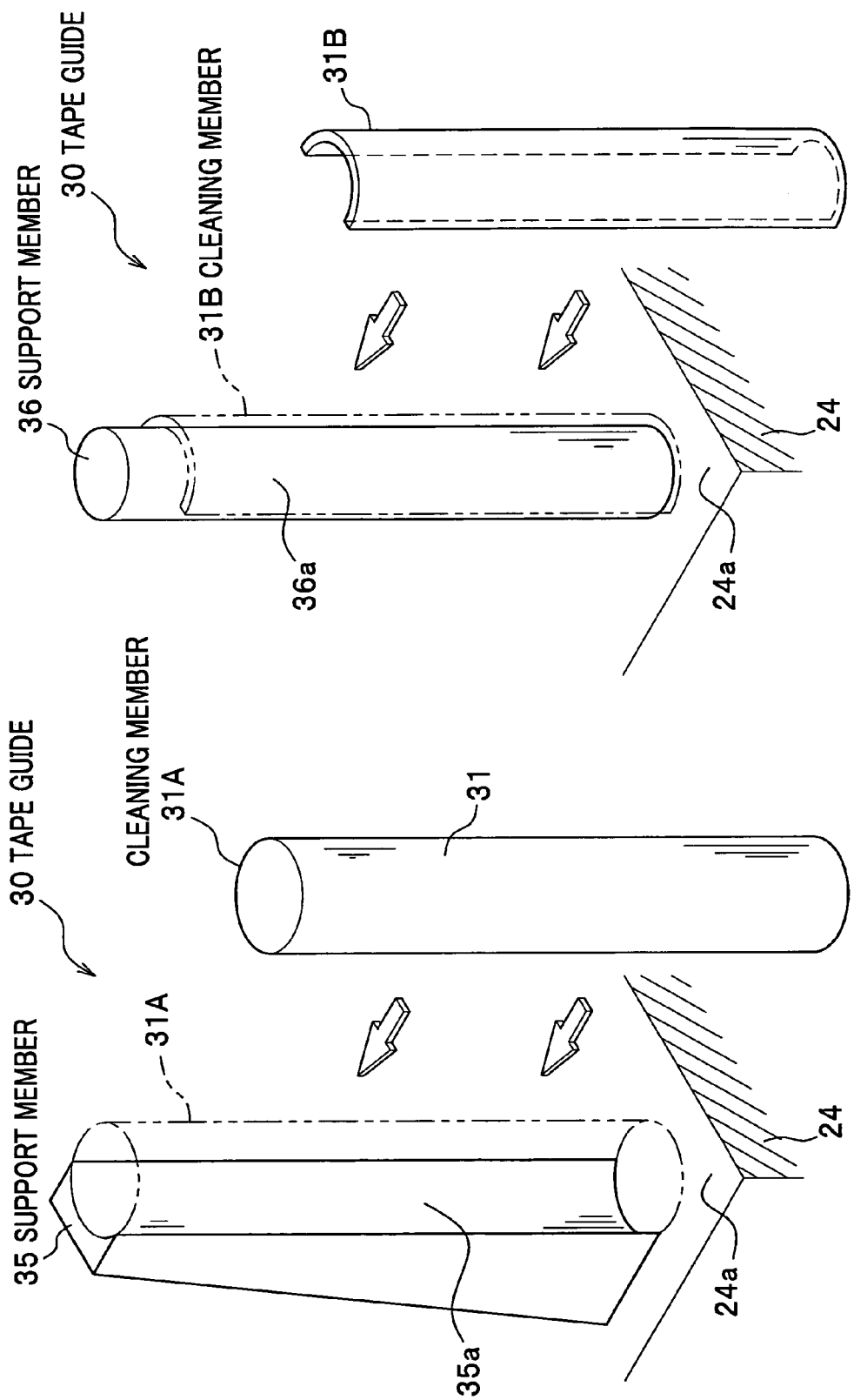

PRIOR ART FIG.7
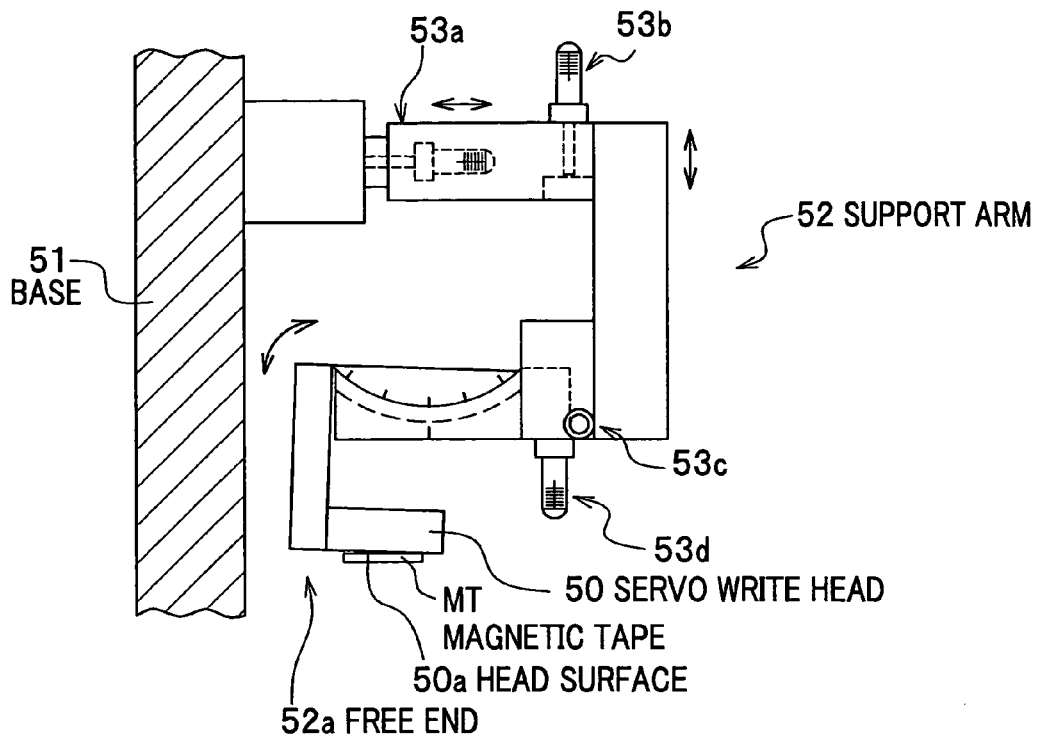
FIG.8
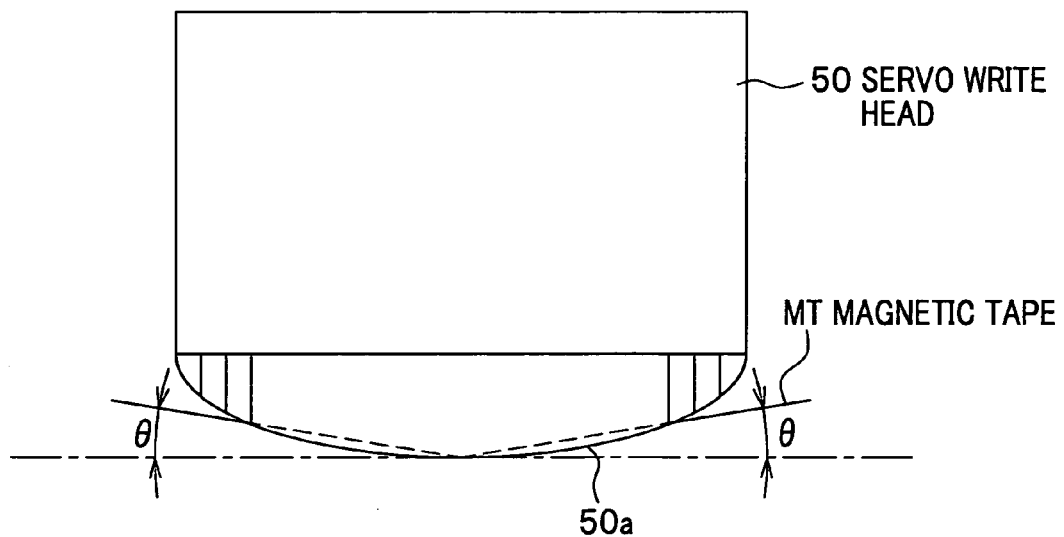

SERVO WRITER WITH ADJUSTMENT MECHANISM

BACKGROUND OF THE INVENTION

1. Field of the Invention

An apparatus consistent with the present invention relates to a servo writer for recording/reproducing servo signals on or from tape-shaped recording media such as magnetic tapes.

2. Description of the Related Art

In recent years, the recording density of magnetic tapes used as data back-up media for computers has been increased. This increase in the recording density has been realized by increasing the number of data tracks formed on a single magnetic tape. For the purpose of reading data from such high density magnetic tapes with great accuracy, multiple servo bands are formed on both sides of each data track. Note that the servo band is a region to/from which a servo signal is to be recorded or reproduced.

Such servo signals need to be written (recorded) precisely on magnetic tapes by using a magnetic tape system such as a servo writer.

FIG. 7 shows an example of a peripheral structure of a servo write head in a conventional servo writer. In this figure, this structure includes a base 51, a support arm 52, and a servo write head 50. The support arm 52 is coupled to the base 51 and has a free end 52a. A servo write head 50 is placed on the free end 52a and has a head surface 50a facing a recording surface of a magnetic tape MT. The support arm 52 has a position adjusting means made up of precision components, and it adjusts the position of the servo write head 50 with respect to the magnetic tape MT. The position adjusting means includes a tape-width direction adjusting mechanism 53a, a lap angle adjusting mechanism 53b, an azimuth angle adjusting mechanism 53c, and a tilt angle adjusting mechanism 53d. By turning their individual knobs, the position of the servo write head 50 with respect to the magnetic tape MT can be adjusted. Thus, servo signals are recorded on desired locations of the magnetic tape MT.

Another example of this mechanism is described in Japanese Unexamined Patent Application Publication 2001-093211. In the exemplified mechanism, the servo write head is fixed, a magnetic tape is movable, and its position is adjustable. Further, by adjusting the position of the magnetic tape, servo signals are recorded on desired locations of the magnetic tape.

Referring back to FIG. 7, each of the adjusting mechanisms 53a to 53d in the conventional servo writer needs to be precise, and inevitably involves high costs. In addition, to adjust the position of the servo write head 50, its lap and tilt angles need to be adjusted appropriately, but this adjustment has the following disadvantage.

The adjustable range of the lap angle θ needs to fall within 5.0°±0.5° (each side 2.5°±0.5°) with respect to the head surface 50a of the servo write head 50, as shown in FIG. 8. Since this range is very narrow, it takes a long time adjusting. In addition, costs for maintaining this lap angle θ end up being high.

On the other hand, by adjusting the tilt angle, one side of the magnetic tape MT along its length is pressed against the servo write head 50 more strongly than the other side. Accordingly, the displacement amount of the magnetic tape MT is advantageously decreased, but the head surface 50a is prone to wear unevenly. Furthermore, magnetic powder of the magnetic tape MT is more likely to be stuck on the head surface 50a, thus increasing the occurrence of recording/reproducing errors.

Taking the above disadvantage into account, the present invention has been conceived. An object of the present invention is to provide a low cost servo writer with a simple adjusting mechanism, which can record/reproduce servo signals on or from magnetic tapes with great accuracy. An additional object of the present invention is to provide a servo writer which makes it possible to shorten the adjusting and maintenance time and to minimize the uneven wear of its head, thereby decreasing the level of contaminants of the heads (servo write head and the like).

SUMMARY OF THE INVENTION

According to an aspect of the present invention, there is provided, a servo writer including:

(1) a head for recording/reproducing servo signals on or from a running tape;
(2) a base;
(3) a support arm having two ends, one of the ends being supported by the base, the other being a free end on which the head is placed, the support arm allowing the head to move with respect to the tape; and
(4) a plurality of tape guides for maintaining a constant lap angle, the tape guides being arranged on the free end of the support arm, wherein the lap angle is an angle which the head forms with the running tape.

In the above servo writer, even if the head excessively presses the tape when the position of the head with respect to the tape is adjusted, the lap angle is prevented from being varied and is kept constant by the tape guides. Specifically, the lap angle is not determined by the adjustment of the support arm, but is inevitably determined by the tape guides. Accordingly, the conventional time-consuming process by which the lap angle is adjusted by the position adjustment of the support arm can be eliminated, so that the adjusting time is greatly shortened. In addition, the structure for adjusting the lap angle can be simplified, thereby providing the servo writer at a low manufacturing cost. Eventually, it is possible to realize the servo writer with a simple structure, which makes it possible to adjust the lap angle with great accuracy. Furthermore, due to the fact that the lap angle is kept constant by the tape guides, the cost for maintaining the lap angle can be reduced.

Moreover, because the tape runs in contact with not only the head but also the tape guides, the force applied to the head unevenly is dispersed. This can reduce the tendency for the head surface H11 to wear unevenly, thus increasing the durability of the head. Also, the recording/reproducing errors due to fragments stuck on the head surface are less likely to occur, so that the recording/reproducing quality of the tape is improved.

According to another aspect of the present invention, there is provided, the servo writer in which the tape guides are arranged close to the head and on respective sides of the head along a running route of the tape.

In this servo writer, the lap angle is made more stable, so that the contact property between the tape and head is enhanced. This contributes to the improvement in recording/reproducing of servo signals on or from the tape.

According to still another aspect of the present invention, there is provided, the servo writer in which the free end of the support arm has a support portion through which the free end is supported on the base.

Owing to this support portion, the free end of the support arm is prevented from being displaced and vibrated. Consequently, it is possible to provide the servo writer which can record/reproduce servo signals on or from the tape with great accuracy.

According to yet another aspect of the present invention, there is provide, the servo writer in which at least one of the tape guides comprises, at its contact portion for the tape, a cleaning member which has a function of removing contaminants from a surface of the tape.

With this function, the guide eliminates contaminants from the surface of the magnetic tape, thereby contributing to the high accurate reproduction/record of servo signals. The tape guide having the cleaning function eliminates the need for an additional cleaning mechanism. This results in the compact design and the cost reduction of the servo writer.

In conclusion, it is possible to achieve a low cost servo writer with a simple adjusting mechanism, which can record/reproduce servo signals on or from magnetic tapes with great accuracy. Furthermore, the servo writer makes it possible to shorten the adjusting and maintenance time and to minimize the uneven wear of its heads (a servo write head and the like), thereby decreasing the level of contaminant of the heads.

BRIEF DESCRIPTION OF THE DRAWINGS

For more complete understanding of the present invention and the advantages hereof, reference is now made to the following description taken in conjunction with the accompanying drawings wherein:

FIG. 5A is an enlarged perspective view depicting a first modification of a tape guide of the servo writer according to one embodiment of the present invention;

FIG. 5B is an enlarged perspective view depicting a second modification of the tape guide of the servo writer according to one embodiment of the present invention;

FIG. 7 is a view depicting a conventional servo writer; and

FIG. 8 is a schematic view depicting a head for explaining a lap angle.

DETAILED DESCRIPTION OF THE EXEMPLARY EMBODIMENTS OF THE INVENTION

Figure 1:
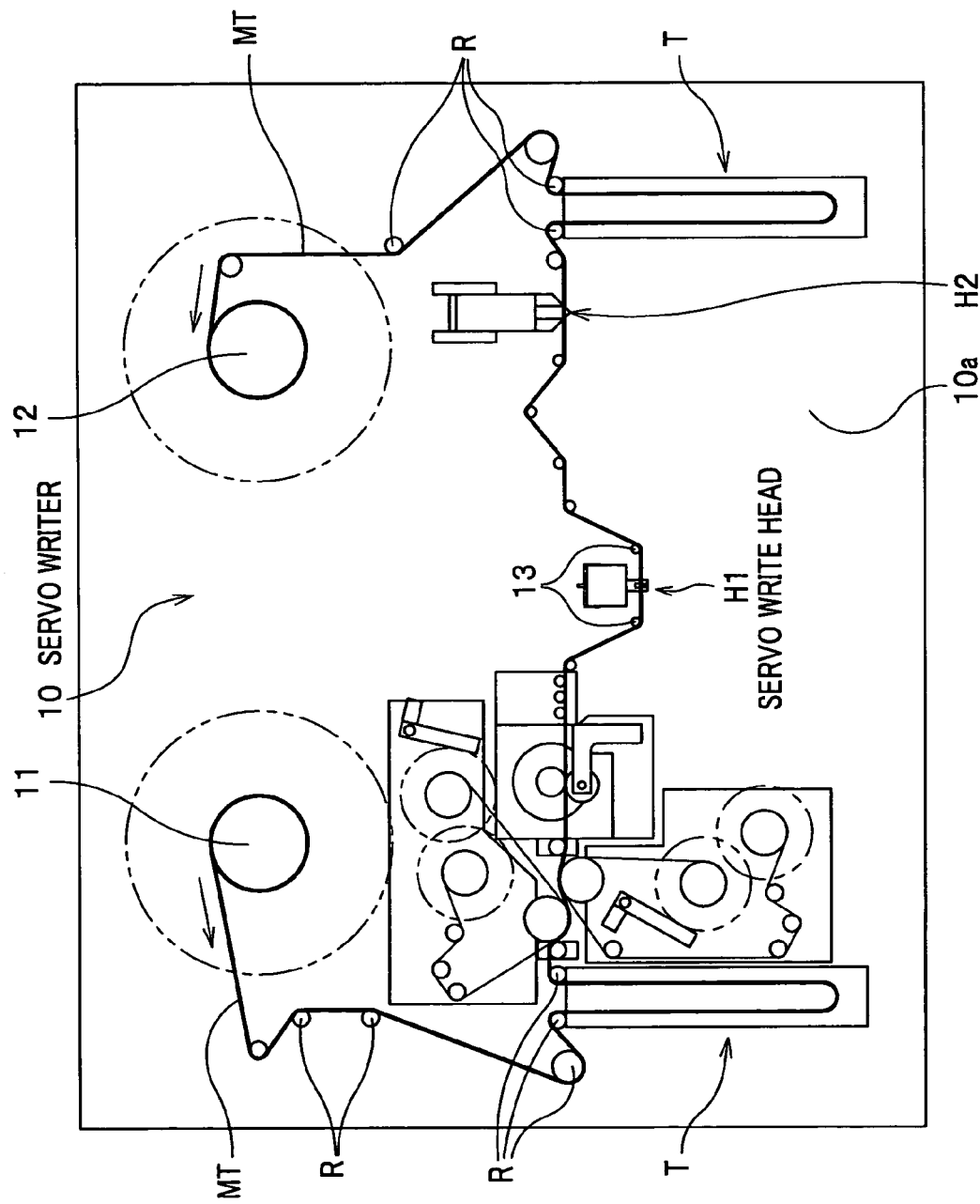
FIG. 1 is a conceptual view depicting a structure of a servo writer according to one embodiment of the present invention.

A description will be given below in detail of a servo writer according to one embodiment of the present invention, with reference to accompanying figures as appropriate. Note that this description is concentrated on a servo write head of the servo writer.

First, a whole structure of a servo writer 10 will be described. A servo writer 10 includes (1) a supply reel 11 that feeds a magnetic tape MT, (2) a take-up reel 12 that winds the magnetic tape MT from the supply reel 11, and (3) a servo write head H1 that is placed downstream of the supply reel 11 and upstream of the take-up reel 12, and that writes, on the magnetic tape MT, servo signals each composed of trapezoidal servo patterns. The servo writer 10 further includes (4) guides 13 and 13, and (5) a verify head H2. The guides 13 and 13 are arranged upstream and downstream of the servo write head H1, respectively, and run the magnetic tape MT being in contact with the servo write head H1. The verify head H2 is placed between the take-up reel 12 and the guide 13 positioned right with respect to the servo write head H1 in this figure, and inspects the servo signals having been written by the servo write head H1. Furthermore, the servo writer 10 includes tension adjusting device T that adjusts the tension of the magnetic tape MT to a predetermined value, a tension inspecting device (not shown), guides R that guide the running of the magnetic tape MT, and other various devices.

The above servo writer 10 (a) feeds the magnetic tape MT from the supply reel 11; (b) rotates a capstan roller to run the magnetic tape MT on a predetermined route while guiding it with the guides R; (c) records servo signals on the magnetic tape MT with the servo write head H1; (d) inspects the recorded servo signals with the verify head H2; and (e) winds the magnetic tape MT around the take-up reel 12.

Figure 2:
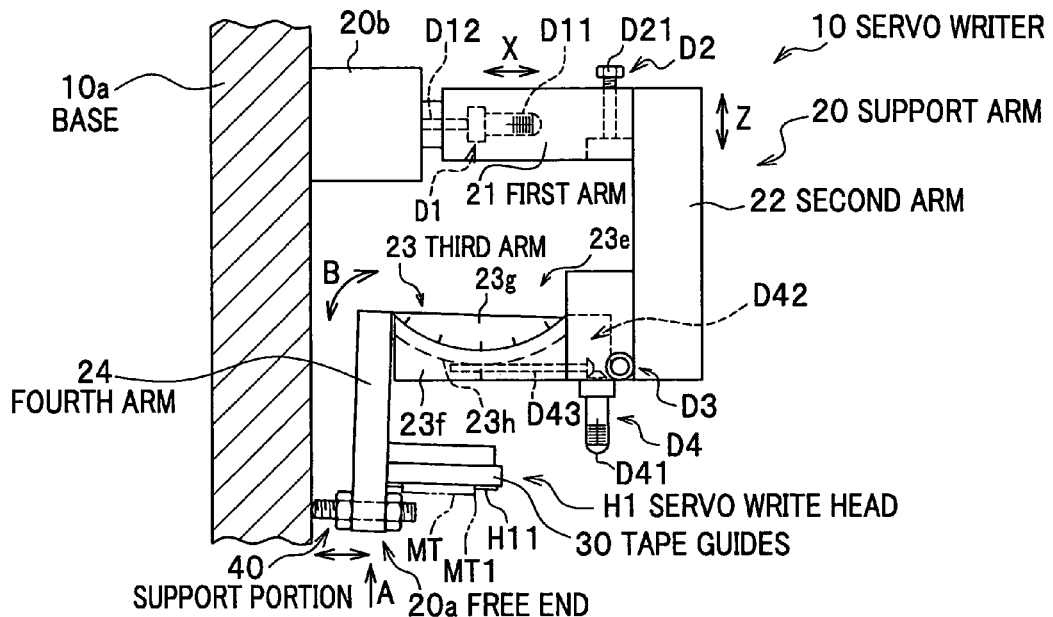
FIG. 2 is a schematic view depicting a whole structure of vicinity of a head in the servo writer.

Next, a description will be given below in detail of a peripheral structure and arrangement of the servo write head H1. Referring to FIG. 2, the servo writer 10 includes a base 10a, and a support arm 20 having two ends; one end is installed on the base 10a and the other is a free end 20a on which a servo write head H1 is placed. The support arm 20 is provided with adjusting mechanisms D1 to D4 (described later) for adjusting the position of the servo write head H1 with respect to the magnetic tape MT. On the free end 20a of the support arm 20, tape guides 30 and 30 are arranged.

Figure 3A:
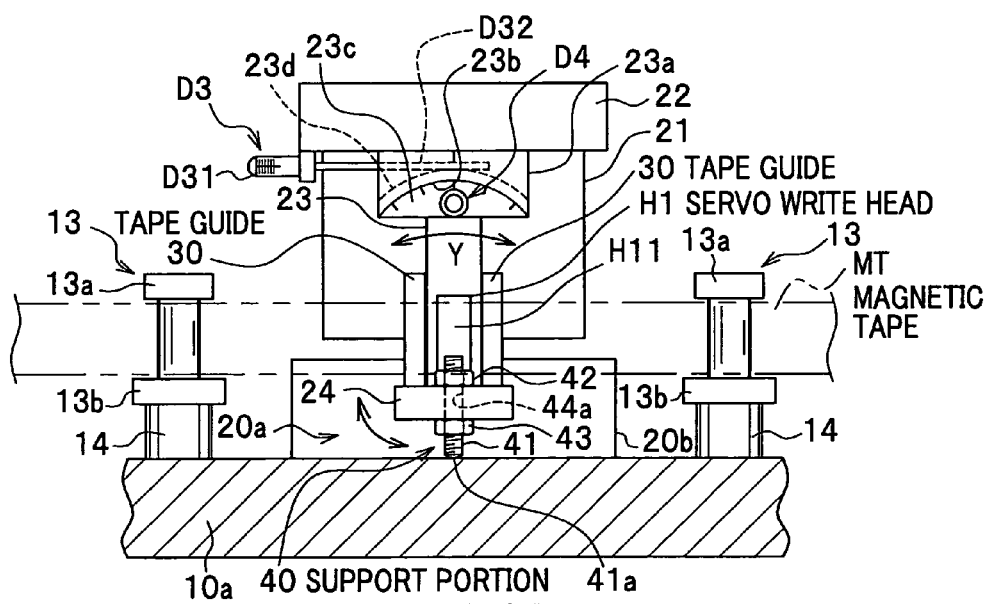
FIG. 3A is a schematic view depicting the whole structure of vicinity of the head in the servo writer, as seen from an arrow A of FIG. 2.

Referring to FIG. 3A, the guides 13 and 13 are rotatably installed on the base 10a through the support members 14 and 14, respectively. Also, each of them has flanges 13a and 13b that decreases the displacement amount of the magnetic tape MT along its width.

Turning back to FIG. 2, the servo write head H1 has a head surface H11 to be in contact with the recording surface of the running magnetic tape MT. In addition, this head surface H11 records the servo signals on corresponding servo bands of the magnetic tape MT.

The servo write head H1 has a head core (not shown) on which a coil is wound, and magnetic gaps of a predetermined pattern formed on the head surface H11. The servo write head H1 is supplied with pulse currents from a servo signal supply circuit (not shown) through a wire or the like, the pulse currents being for recording servo signals. When the pulse currents are supplied, the servo write head H1 generates leakage flux from the magnetic gaps and, then magnetizes a magnetic layer (not shown) of the magnetic tape MT. As a result, the servo signals for controlling the positions of writing and reproducing heads of a recording/reproducing device are written on the magnetic tape MT. Note that the servo signals are written on corresponding servo bands (not shown) formed along the long side of the magnetic tape MT.

The support arm 20 includes a foundation 20b fixed on the base 10a, and first to fourth arms 21 to 24 having the adjusting mechanisms D1 to D4, respectively. In addition, the support arm 20 is configured to adjust the position of the servo write head H1 with respect to the magnetic tape MT.

The first arm 21 can move in the direction perpendicular to the base 10a (in the direction of an arrow X or along the width of the magnetic tape MT), and this movement is adjusted with the adjusting mechanism D1. The adjusting mechanism D1 is composed of an adjusting knob D11 and an adjusting screw D12 turned by the adjusting knob D11. The rotation of the adjusting screw D12 allows the first arm 21 to move in the direction of the arrow X.

The second arm 22 is coupled to an end of the first arm 21, and can move in the direction perpendicular to the first arm 21 (in the direction of an arrow Z or along the thickness of the magnetic tape MT)), and adjusts a lap angle of the servo write head H1 with respect to the magnetic tape MT. The movement of the second arm 22 is adjusted by turning an adjusting screw D21, and the second arm 22 moves in the direction of the arrow Z in accordance with the rotation of the adjusting screw D21. In one embodiment, the structure of the adjusting mechanism D2, that is, the structure for adjusting the lap angle of the servo write head H1 is simpler than those of the adjusting mechanisms D1, D3 and D4. In other words, compared to the adjustments performed with the adjusting mechanism D1, D3 and D4, the adjustment of the adjusting mechanism D2 is rough, and its minimum movable range of the adjusting screw D21 is large.

The third arm 23 is coupled to an end of the second arm 22. As shown in FIG. 3A, the third arm 23 is configured to adjust an azimuth angle of the servo write head H1 in the direction of an arrow Y by using the adjusting mechanism D3. The third arm 23 includes a support member 23a fixed to the second arm 22, and an out-curved portion 23c which is mated with an in-curved portion 23b of the support member 23a and which slides along the arc-shape of the in-curved portion 23b. The out-curved portion 23c has an out-curved worm wheel 23d. The adjusting mechanism D3 is composed of an adjusting knob D31, and a worm gear D32 turned by the adjusting knob D31 and mated with the worm wheel 23d. In this way, turning the adjusting knob D31 allows the out-curved portion 23c to swivel, so that the azimuth angle of the servo write head H1 is adjusted.

The fourth arm 24, which is coupled to one end of the third arm 23 and is positioned close to the base 10a, has the servo write head H1 at the free end 20a. The fourth arm 24 is configured to adjust a tilt angle (in the direction of an arrow B) of the servo write head H1 by using the adjusting mechanism D4 of the third arm 23. The fourth arm 24 is fixed to an out-curved portion 23g mated with an in-curved portion 23f of a coupling portion 23e in the third arm 23. On the out-curved portion 23g, an arc-shaped worm wheel 23h is formed protruding toward the in-curved portion 23f. The adjusting mechanism D4 is composed of the adjusting knob D41, a bevel gear mechanism D42 turned by the adjusting knob D41, and a worm gear D43 turned through the bevel gear mechanism D42 and mated with the worm wheel 23h. In this way, turning the adjusting knob D41 allows the out-curved portion 23g to swivel, so that the tilt angle of the servo write head H1 is adjusted.

Figure 3B:
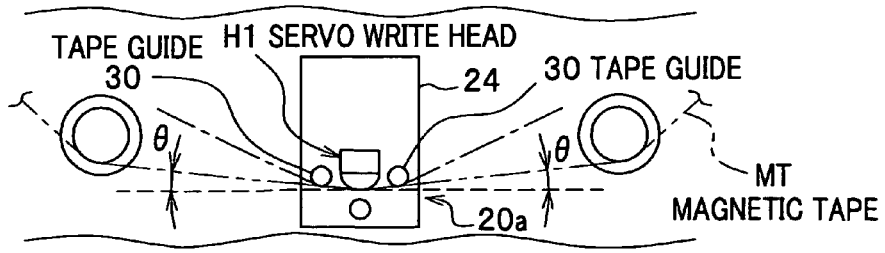
FIG. 3B is a schematic view explaining a lap angle.

Each of the tape guides 30 and 30 is made of a non-magnetic material, and has a contact portion 31 to be in contact with the magnetic tape MT. This contact portion 31 has an out-curved surface. The tape guides 30 and 30 are arranged close to each other and on the respective sides of the servo write head H1 at the free end 20a in the fourth arm 24, as shown in FIG. 3B. In one embodiment, note that the tape guides 30 and 30 are arranged somewhat behind the head surface H11 of the servo write head H1 on a horizontal plane, as shown in FIG. 3B (somewhat above the head surface H11 in this figure). This is because the lap angle θ which the servo write head H1 forms with the magnetic tape MT is defined to within 5.0°±0.5° (each side 2.5°±0.5°).

It is preferable that each of the tape guides 30 and 30 is made of a hard, non-magnetic and non-static material, such as zirconia or alumina ceramics, which has high wear resistance and low friction resistance against the magnetic tape MT. In one embodiment, the whole tape guides 30 and 30 are made of ceramics, and have a cleaning function of removing contaminants from the surface of the magnetic tape MT. The surface roughness of the tape guides 30 and 30 is set to preferably less than 0.2 μmRa, more preferably 0.05 μmRa to 0.20 μmRa in a polishing treatment. Because of the above property, the tape guides 30 and 30 fulfils the cleaning function of removing contaminants from the surface of the magnetic tape MT without any scratches. In addition, the tape guides 30 and 30 are formed to be longer than the servo write head H1 along the width of the magnetic tape MT (see FIG. 3A). This is because the tape guides 30 and 30 surely guide the magnetic tape MT, even if the position of the servo write head H1 with respect to the magnetic tape MT is varied due to the adjustment of the adjusting mechanisms D1 to D4. In one embodiment, the tape guides 30 and 30 are longer than the servo write head H1 by about half of the width of the magnetic tape MT, as shown FIG. 3A. In addition, it is preferable that the diameter of the tape guides 30 and 30 is defined so as not to affect the running of the magnetic tape MT. For example, the diameter may be 2 mm to 4 mm.

In one embodiment, on the free end 20a of the fourth arm 24, a support portion 40 is provided. The support portion 40 is composed of a support bolt 41, an adjusting nut 42, and a detent nut 43, as shown in FIG. 3A. It is preferable that each of these three members is made of a hard material, such as a ceramic, which does not affect the process by which the servo write head H1 writes the servo signals.

The support bolt 41 is fitted into a screw hole 44a formed on the free end 20a of the fourth arm 24 in the support arm 20, and is then fixed by the adjusting nut 42 and detent nut 43. As a result, the support bolt 41 is attached to the free end 20a. The support bolt 41 has a spherical end 41a, so that the support bolt 41 is in point-contact with the base 10a. Accordingly, the contact of the support bolt 41 with the base 10a does not affect the adjustment of the azimuth and tilt angles of the servo write head H1. In this case, the contact part of the base 10a with the support bolt 41 may be made of a hard material such as ceramic. The length in which the support bolt 41 protrudes toward the base 10a from the fourth arm 24 can be adjusted by turning the adjusting nut 42 or detent nut 43, so that the distance between the base 10a and the free end 20a is adjusted to a desired value.

The end 41a of support bolt 41 of the support portion 40 is typically in contact with the base 10a. It is preferable that the end 41a is adjusted to press the base 10a at predetermined force, as will be described later.

In the servo writer 10 described above, the position of the servo write head H1 is adjusted as follows.

First, the positions of the first to fourth arms 21 to 24 are adjusted with the adjusting mechanisms D1 to D4 of the support arm 20, so that the servo write head H1 is positioned at a desired location on the magnetic tape MT. In this case, the lap angle of the support arm 20 may roughly be adjusted with the adjusting mechanism D2, as described above. Specifically, as shown in FIG. 3B, the lap angle θ is limited to about 2.5° by the tape guides 30 and 30 installed on the respective sides of the servo write head H1. Therefore, the lap angle θ is kept about 2.5°, merely by moving the second arm 22 to the position where the tape guides 30 and 30 press the magnetic tape MT by using the adjusting mechanism D2. This adjusting manner facilitates the adjustment of the support arm 20.

Figure 4:
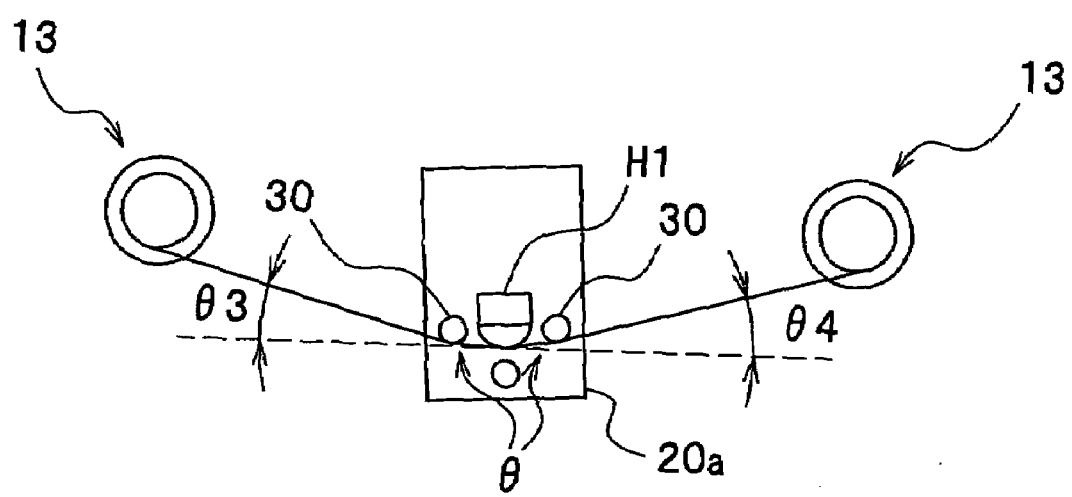
FIG. 4 is a schematic view explaining another lap angle.

In this case, even if the servo write head H1 excessively presses the magnetic tape MT as the case of the magnetic tape MT shown by a dashed line in FIG. 3B, the lap angle θ of the servo write head H1 with respect to the magnetic tape MT is hardly varied. If anything, the lap angle θ is maintained to a constant value owing to the tape guides 30 and 30. Thus, the lap angle θ is not defined by the adjustment of the support arm 20, but is inevitably defined by the tape guides 30 and 30. Referring to FIG. 4, even though the guides 13 and 13 form different angles θ3 and θ4 with the servo write head H1, the lap angle θ near the servo write head H1 is maintained to a constant value by the tape guides 30 and 30. As a result, the contact between the servo write head H1 and the magnetic tape MT is always kept constant.

Resulting from adjusting the tilt angle of the servo write head H1 of the support arm 20, the servo write head H1 may press the magnetic tape MT unevenly, as shown in FIG. 2. However, since the tape guides 30 and 30 are tilted at the same angle as that of the servo write head H1, not only the servo write head H1 but also the tape guides 30 and 30 receive the uneven force. Therefore, the uneven force applied to the servo write head H1 is dispersed, thereby minimizing the uneven wear of the servo write head H1.

The above adjusting process needs to be performed while the support bolt 41 of the support portion 40 at the free end 20a of the support arm 20 is not in contact with the base 10a. After the adjustment of the support arm 20, the first arm 21 is made to further move toward the base 10a by turning the adjusting knob D11 of the adjusting mechanism D1. In this case, assuming that this moving distance is 150 μm.

Following this, the support bolt 41 of the support portion 40 is made to abut on the base 10a, and support bolt 41 is made to further protrude toward the base 10a by 150 μm by turning the adjusting nut 42. In this state, the support bolt 41 is secured by fastening the detent nut 43.

As a result, the free end 20a of the support arm 20 keeps pressing the base 10a through the support bolt 41 of the support portion 40. In this case, the distance where the support arm 20 has moved beforehand is cancelled by adjusting the support bolt 41, thereby ensuring positioning of the servo write head H1 with respect to the magnetic tape MT. Further, as a result of this adjusting process, the free end 20a of the support arm 20 keeps pressing the base 10a through the support bolt 41, thereby reducing the vibration of the servo write head H1.

With the servo writer according to one embodiment that has been described above, the following effects can be achieved.

1) The tape guides 30 and 30 (which are arranged on the free end 20a of the support arm 20 and on the respective sides of the servo write head H1 along the running route of the magnetic tape MT) function to keep the lap angle θ (see FIG. 3B) constant. This makes it possible to eliminate the skilled adjusting process by which the position and lap angle θ of the support arm 20 are adjusted at the same time, thereby greatly reducing the adjusting time. In addition, the structure of the mechanism for adjusting the lap angle (the adjusting mechanism D2) can be made simple. Consequently, it is possible to realize the simple servo writer at a low manufacturing cost, in which the lap angle θ can be adjusted with great accuracy, as well as which can reduce its maintenance cost in the adjustment.

2) Since not only the servo write head H1 but also the tape guides 30 and 30 are in contact with the running magnetic tape MT, the uneven force applied to the servo write head H1 can be dispersed. This can reduce the tendency for the head surface H11 to wear unevenly, so that the durability of the servo write head H1 is increased, as well as the recording/reproducing errors of the magnetic tape MT are less likely to occur due to magnetic powder or fragments stuck on the head surface H11. Consequently, with this servo writer, the servo signals can be recorded/reproduced on or from the magnetic tape MT with great accuracy.

3) Because the tape guides 30 and 30 are arranged close to the servo write head H1, the lap angle θ which the servo write head H1 forms with the magnetic tape MT is less varied. As a result, it is possible to achieve the high contact property between the magnetic tape MT and the servo write head H1. Accordingly, the servo signals can be recorded/reproduced on or from the magnetic tape MT with great accuracy.

4) Since the tape guides 30 and 30 have a cleaning function, the both guides eliminate contaminants from the surface of the magnetic tape MT, thereby contributing to the high accurate reproduction/record of servo signals.

(a) The tape guides 30 and 30 are positioned upstream and downstream of the servo write head H1, respectively, in the running direction of the magnetic tape MT. Therefore, the upstream guide 30 removes contaminants from the surface of the magnetic tape MT. Also, the downstream guide 30 removes contaminants generated when the magnetic tape MT runs in contact with the servo write head H1. This achieves the high accurate reproduction/record of servo signals.

(b) The tape guides 30 and 30 having the cleaning function eliminate the need for an additional cleaning mechanism. This results in the compact design and the cost reduction of the servo writer.

(c) Since the tape guides 30 and 30 are made of ceramics, it is possible to provide the tape guides having high wear resistance and a long lifetime.

(d) Each of the tape guides 30 and 30 has a cylindrical shape, and is provided with a contact portion 31 having the out-curved surface. This cylindrical shape disperses the pressure against which the magnetic tape MT exerts the contact portion 31, in comparison with a rectangular shape. As a result, the surface of the magnetic tape MT is prevented efficiently from being scratched. Specifically, the servo writer 10 can eliminate contaminants from the surface of the magnetic tape MT without any scratches and, thus, realizes the long-time operation.

5) The free end 20a of the support arm 20 is supported by the support portion 40 through the support portion 40. Accordingly, positioning of the servo write head H1 is made easier, as well as the vibration thereof can be minimized. Hence, it is possible to provide the high-quality servo writer capable of recording or reproducing the servo signals on or from the magnetic tape MT.

Referring to FIG. 5A, the tape guide 30 is composed of a trapezoidal support member 35 and a cleaning member 31A separately. The cleaning member 31A is made of ceramics and is provided with an out-curved surface (i.e. contact portion 31). This cleaning member 31A is attached to an in-curved surface 35a by means of an adhesive agent, a thermal treatment or the like. The in-curved surface 35a of the support member 35 is provided vertical to the upper surface 24a of the fourth arm 24, and the cleaning member 31A can therefore be placed vertical to the upper surface 24a.

The above structure facilitates the attachment and adjustment of the cleaning member 31A, compared to the structure in which the cleaning member 31A is secured directly to the fourth arm 24. In addition, by adjusting the property of an adhesive agent, etc., it is also easy to detach the cleaning member 31A from the support member 35 and to exchange it.

Referring to FIG. 5B, the tape guide 30 is composed of a cylindrical support member 36 and an arc-shaped cleaning member 31B separately. This cleaning member 31B is attached to a circumferential surface 36a of the support member 36 by means of an adhesive agent, a thermal treatment or the like. This structure also eases the attachment, adjustment and exchange of the cleaning member 31B.

Figure 6B:
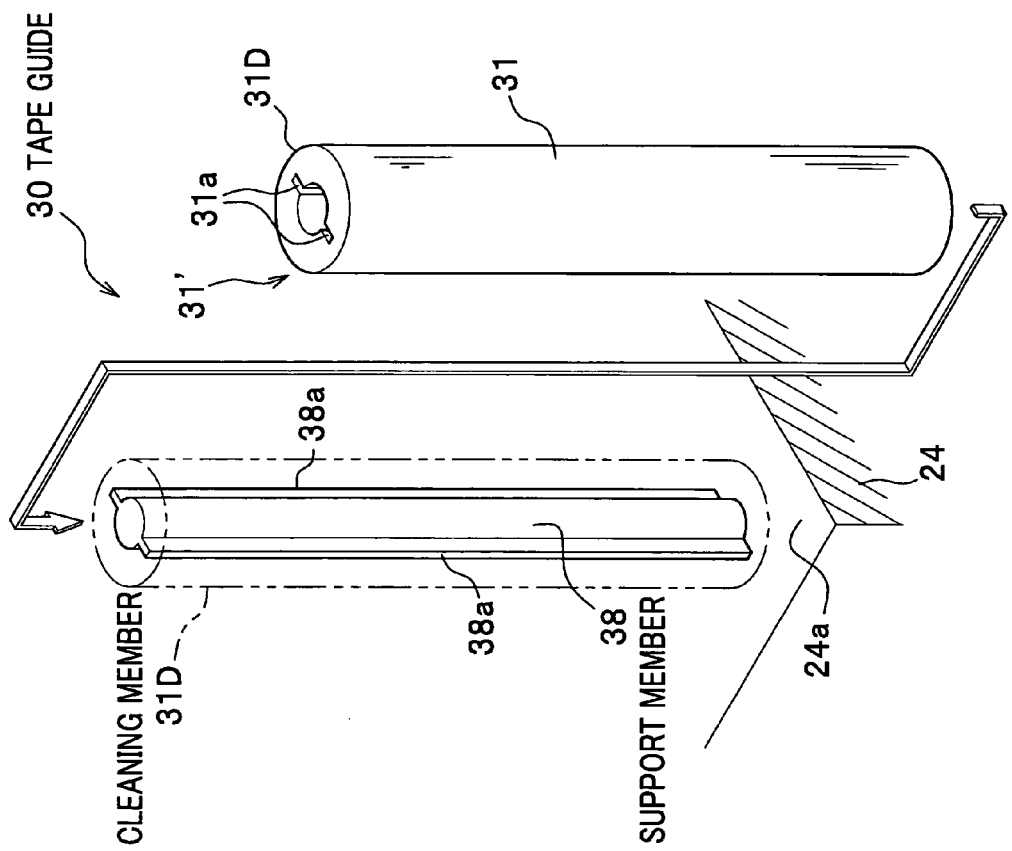
FIG. 6B is an enlarged perspective view depicting a fourth modification of the tape guide of the servo writer according to one embodiment of the present invention.
Figure 6A:
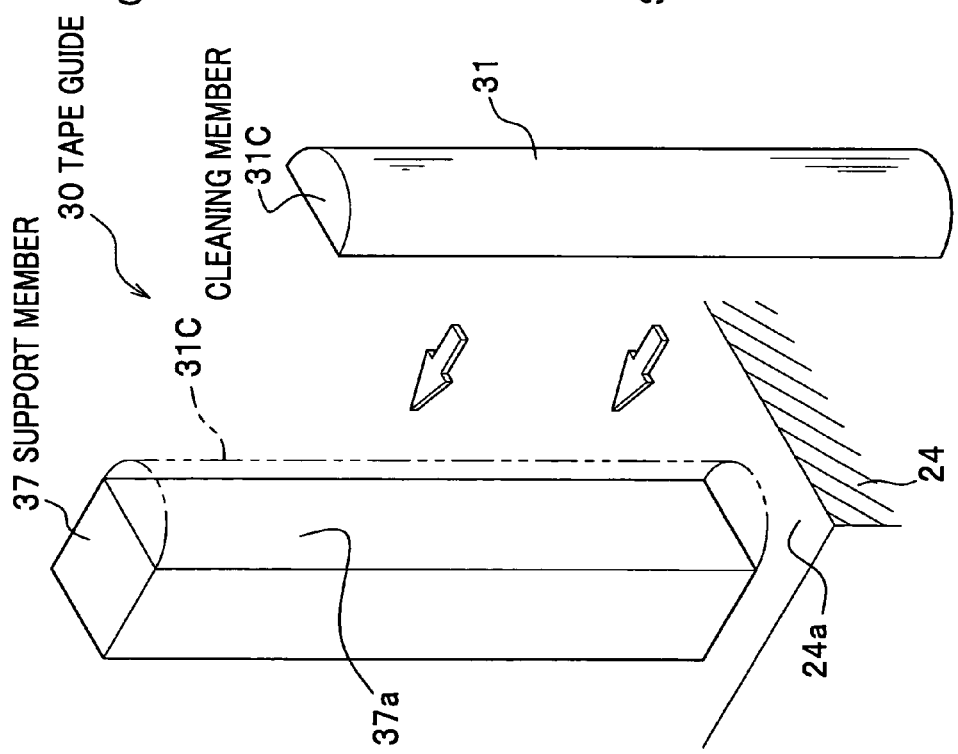
FIG. 6A is an enlarged perspective view depicting a third modification of the tape guide of the servo writer according to one embodiment of the present invention.

Referring to FIG. 6A, the tape guide 30 is composed of a rectangular-pillared support member 37 and a dome-shaped cleaning member 31C separately. In this case, the cleaning member 31C is secured to a side surface 37a of the support member 37.

Referring to FIG. 6B, the tape guide 30 is composed of a rod-shaped support member 38 with ribs 38a and 38a and a cylindrical cleaning member 31D with internal grooves 31a and 31a. In this case, the support member 38 is covered by the cleaning member 31D, with the ribs 38a and 38a being inserted into the corresponding grooves 31a and 31a. To exchange the contact portion, the cleaning member 31D is simply rotated by 180 degrees, and the virgin surface of the cleaning member 31D is used as the contact portion. This enables the facilitation of the maintenance and the cost reduction.

Up to this point, one embodiment of the present invention has been described. However, it is obvious that the present invention is not limited to this embodiment, and various modifications and variations can be conceived in accordance with the spirit of the present invention as appropriate. To give an example, the present invention can be applied to not only the peripheral structure of the servo write head H1, but also that of the verify head H2. In this case, the skilled process by which the lap angle θ of the verify head H2 is adjusted can be eliminated, thus greatly reducing the adjusting time and simplifying the structure for adjusting the lap angle θ (the adjusting mechanism D2). Consequently, it is possible to provide the servo writer 10 at low manufacturing cost. Furthermore, in one embodiment, the two tape guides 30 and 30 are arranged on the respective sides of the servo write head H1, but more than two tape guides may be arranged. In this case, the number of tape guides may not be an even number. Moreover, in one embodiment, each tape guide 30 has a cylindrical circumferential surface, but it may have a surface in any shape as long as its contact surface for the running magnetic tape MT has a low friction resistance.

The cleaning function may be incorporated in any one of the tape guides positioned upstream and downstream of the servo write head H1, respectively. Furthermore, an additional tape guide having a cleaning function may be provided at the side of the servo write head H1.

The tape guides 30 and 30 may be rotated automatically by means of the driving mechanism of the fourth arm 24 so that the contact surface 31 is exchanged. Moreover, a brush, a wiper, a vacuum mechanism, a compressed air blower, and the like may be provided to eliminate contaminants from the tape guides 30 and 30.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A servo writer comprising:
    a head for recording/reproducing servo signals on or from a running tape;
    a base;
    a support arm having two ends, one of the ends being supported by the base, the other being a free end on which the head is placed, the support arm allowing the head to move with respect to the tape; and
    a plurality of tape guides for maintaining a constant lap angle, the tape guides being arranged on the free end of the support arm, wherein the lap angle is an angle which the head forms with the running tape,
    wherein at least one of the tape guides comprises, at its contact portion for the tape, a cleaning member with an out-curved surface which has a function of removing contaminants from a surface of the tape, and further comprises a support member having a rod shape with a plurality of ribs.

2. The servo writer according to claim 1,
    wherein the cleaning member covers a whole circumference of the support member and is detachable from the support member.

3. The servo writer according to claim 1,
    wherein the tape guides are arranged close to the head and on respective sides of the head along a running route of the tape.

4. The servo writer according to claim 3,
    wherein the lap angle is formed by the longitudinal bend of the running tape.

5. The servo writer having said plurality of tape guides arranged on the free end close to the head according to claim 3,
    wherein another plurality of tape guides, displaced from said plurality of tape guides, are arranged on the base.

6. The servo writer according to claim 1,
    wherein the free end of the support arm comprises a support portion through which the free end is supported on the base.

7. The servo writer according to claim 6,
    wherein the support portion is adjustable.

8. The servo writer according to claim 1,
    wherein the head has a head surface to be in contact with the tape, and the head surface protrudes toward the tape from contact portions of the tape guides with the tape.

9. The servo writer according to claim 8,
    wherein the tape guides are arranged behind the head surface.

* * * * *